(12) United States Patent
Goebel et al.

(10) Patent No.: US 7,904,282 B2
(45) Date of Patent: Mar. 8, 2011

(54) METHOD AND SYSTEM FOR FAULT ACCOMMODATION OF MACHINES

(75) Inventors: Kai Frank Goebel, Mountain View, CA (US); Rajesh Venkat Subbu, Clifton Park, NY (US); Randal Thomas Rausch, Ballston Spa, NY (US); Dean Kimball Frederick, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 1016 days.

(21) Appl. No.: 11/689,874

(22) Filed: Mar. 22, 2007

(65) Prior Publication Data

US 2008/0229754 A1 Sep. 25, 2008

(51) Int. Cl.
*G06F 9/455* (2006.01)
(52) U.S. Cl. .................................. 703/7; 700/44; 60/773
(58) Field of Classification Search .................... 703/13, 703/7, 22, 6; 700/44; 60/773, 772; 702/189; 701/3; 370/360
See application file for complete search history.

(56) References Cited

U.S. PATENT DOCUMENTS

| | | | |
|---|---|---|---|
| 2004/0059472 A1* | 3/2004 | Hedrick | 701/3 |
| 2004/0123600 A1* | 7/2004 | Brunell et al. | 60/773 |
| 2005/0187844 A1 | 8/2005 | Chalermkraivuth et al. | |
| 2005/0193739 A1* | 9/2005 | Brunell et al. | 60/772 |
| 2006/0126608 A1* | 6/2006 | Pereira et al. | 370/360 |
| 2006/0142976 A1* | 6/2006 | Bonanni et al. | 702/189 |
| 2006/0271210 A1* | 11/2006 | Subbu et al. | 700/44 |
| 2008/0027704 A1* | 1/2008 | Kephart et al. | 703/22 |
| 2008/0178600 A1* | 7/2008 | Healy et al. | 60/773 |
| 2008/0234994 A1* | 9/2008 | Goebel et al. | 703/7 |

OTHER PUBLICATIONS

Hines, P., "Controlling cascading failures with cooperative autonomous agents", Carnegie Mellon University, Jan. 2005.*
Cheng et al., "Multiobjective decision processes under uncertainty: Applications, problem formulations and solution strategies", American Chemical Society, 2005.*
Subbu et al., "Management of complex dynamic systems based on model-predictive multi-objective optimization", IEEE 2006.*
Camponogara et al., "Designing communication networks for distributed control agents" European Journal of Operations Research, 2004.*
Brusnukina et al., "Application of moving Pareto frontier technique for exploration of dynamic controlled systems", 16th IFAC World Congress, Jul. 2005.*

(Continued)

*Primary Examiner* — Jason Proctor
*Assistant Examiner* — Kandasamy Thangavelu
(74) *Attorney, Agent, or Firm* — Penny A. Clarke

(57) ABSTRACT

A method for multi-objective fault accommodation using predictive modeling is disclosed. The method includes using a simulated machine that simulates a faulted actual machine, and using a simulated controller that simulates an actual controller. A multi-objective optimization process is performed, based on specified control settings for the simulated controller and specified operational scenarios for the simulated machine controlled by the simulated controller, to generate a Pareto frontier-based solution space relating performance of the simulated machine to settings of the simulated controller, including adjustment to the operational scenarios to represent a fault condition of the simulated machine. Control settings of the actual controller are adjusted, represented by the simulated controller, for controlling the actual machine, represented by the simulated machine, in response to a fault condition of the actual machine, based on the Pareto frontier-based solution space, to maximize desirable operational conditions and minimize undesirable operational conditions while operating the actual machine in a region of the solution space defined by the Pareto frontier.

17 Claims, 8 Drawing Sheets

OTHER PUBLICATIONS

Randal Rausch, Daniel E. Viassolo, Aditya Kumar, Kai Goebel, Neil Eklund, Brent Brunell, Pierino Bonanni, "Towards In-Flight Detection and Accommodation of Faults in Aircraft Engines," American Institute of Aeronautics and Astronautics, Inc., AIAA 1st Intelligent Systems Technical Conference Sep. 20-22, 2004, Chicago Illinois, pp. 1-11.

Randal T. Rausch, Kai F. Goebel, Neil H. Eklund, Brent J. Brunell, Integrated In-Flight Fault Detection and Accomodation: A Model Based Study, Proceedings of GT2005 ASME Turbo Expo 2005: Power for Land, Sea and Air Jun. 6-9, 2005, Reno-Tahoe, Nevada, USA, pp. 1-9.

Raj Subbu, Kai Goebel, and Dean K. Frederick, "Evolutionary Design and Optimization of Aircraft Engine Controllers," Copyright 2005 IEEE, IEEE Transactions on Systems, Man and Cybernetics-Part C; Applications and Reviews, vol. 35, No. 4 Nov. 2005, pp. 554-565.

* cited by examiner

METHOD AND SYSTEM FOR FAULT ACCOMMODATION OF MACHINES

FEDERAL RESEARCH STATEMENT

This invention was made with Government support under contract NAS3-01135-Task#3 awarded by NASA. The Government has certain rights in this invention.

BACKGROUND OF THE INVENTION

The present disclosure relates generally to fault accommodation in complex engineered systems using predictive modeling and optimization.

Fault accommodation is becoming an increasingly important subject for complex, fault-tolerant engineered systems, and in particular aircraft engine systems. Faults, if not suitably responded to in a timely manner, may lead to undesirable scenarios, negatively affecting operational safety. In aircraft engines there are a large number of fault root causes. Some of these faults in the high-pressure compressor (HPC) and high-pressure turbine (HPT) modules have symptoms that closely resemble highly deteriorated component states. Such faults may be accommodated by a structured manipulation of the engine control systems.

However, due to the highly nonlinear nature of the engine controller and the fact that it is implemented as a large collection of computer modules (typically over 100) that employ a variety of one- and two-input tables, switching variables, logical elements, limiters, and priority-select logic, to name a few, the control design space is high-dimensional, highly nonlinear, multimodal, and discontinuous. To find an optimal accommodation, it is very important, yet non-trivial, to define the performance metric in a flexible and non-analytical manner. This is necessary in order to properly account for such diverse requirements as maintaining stall margins above certain limits, minimizing both peak temperatures and the time spent above a certain temperature, and obtaining short rise times in response to changes in demand values. Furthermore, the changes must be accomplished over a wide range of flight conditions and disturbance inputs.

Only a very small portion of an overall engine control system is designed to operate in a linear fashion, and even then, the controller gains are often scheduled as functions of the operating conditions (altitude, Mach number, and ambient temperature deviation from standard day, for example). Although much is known about the behavior and design of linear control systems, this information is not relevant to the problems under consideration here. Rather, one must be prepared to work in the nonlinear domain, where theories and analytical results are much more scarce than for the linear domain. Also, the literature on nonlinear control systems, of necessity, tends to deal with specific situations, such as the area of integrator-windup protection (IWP).

It is not to be expected that conventional optimization methods and those that depend on gradient evaluations should work, and in view of the existing art, it would be beneficial to provide an application of evolutionary algorithms to aircraft engine control systems design, where the controls design and optimization is performed using a full-order engine model and full control systems structures that do not oversimplify the inherent complexities in these highly complex nonlinear dynamic systems. Accordingly, there is a need in the art for a non-conventional optimization method to provide real-time adjustments to the controller to recover from some or all of the engine faults.

BRIEF DESCRIPTION OF THE INVENTION

An embodiment of the invention includes a method for multi-objective fault accommodation using predictive modeling. The method assumes the presence of a diagnostic reasoner that indicates the presence of a fault. The method includes using a simulated machine that simulates a faulted actual machine, and using a simulated controller that simulates an actual controller, the simulated machine being controlled by the simulated controller, and the actual machine being controlled by the actual controller. A set of multi-objective optimization processes are performed which include 1) an off-board (off-line) process for pre-generating safety-restoring optimal conditions for quick lookup retrieval when a fault is detected, and 2) either an on-board (on-line) or an off-board (off-line) process that calculates optimal solutions with an expanded set of objectives. Each process is based on specified control settings for the simulated controller and specified operational scenarios for the simulated machine controlled by the simulated controller, to generate a Pareto frontier-based solution space relating performance of the simulated machine to settings of the simulated controller, including adjustment to the operational scenarios to represent a fault condition of the simulated machine. Control settings of the actual controller are adjusted, represented by the simulated controller, for controlling the actual machine, represented by the simulated machine, in response to a fault condition of the actual machine, based on the Pareto frontier-based solution space, to maximize desirable operational conditions and minimize undesirable operational conditions while operating the actual machine in a region of the solution space defined by the Pareto frontier.

An embodiment of the invention includes a system for multi-objective fault accommodation using predictive modeling. The system includes a simulated machine that simulates a faulted actual machine, a simulated controller that simulates an actual controller, the simulated machine being controlled by the simulated controller, and the actual machine being controlled by the actual controller, a processor, and an adjuster portion. The processor performs a multi-objective process, based on specified control settings for the simulated controller and specified operational scenarios for the simulated machine controlled by the simulated controller, to generate a Pareto frontier-based solution space relating performance of the simulated machine to settings of the simulated controller, including adjustment to the operational scenarios to represent a fault condition of the simulated machine. The adjuster portion adjusts control settings of the actual controller, represented by the simulated controller, for controlling the actual machine, represented by the simulated machine, in response to a fault condition of the actual machine, based on the Pareto frontier-based solution space, to maximize desirable operational conditions and minimize undesirable operational conditions while operating the actual machine in a region of the solution space defined by the Pareto frontier.

An embodiment of the invention includes a computer readable medium for multi-objective fault accommodation using predictive modeling, the computer readable medium includes computer executable instructions for facilitating an embodiment of the aforementioned method.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
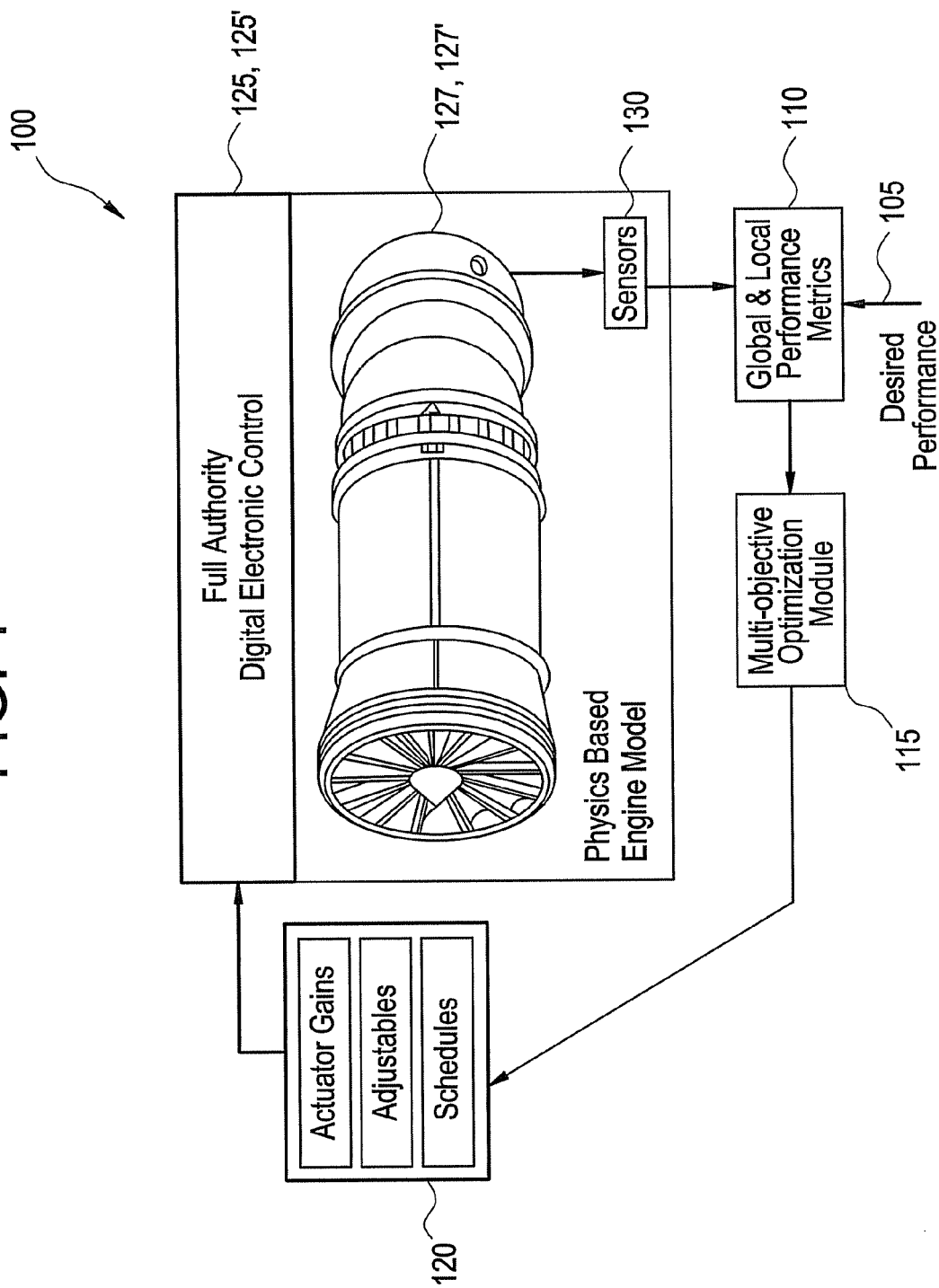
FIG. 1 depicts in block diagram form a computational model having sub-blocks in accordance with embodiments of the invention.

Embodiments of the invention relate to fault accommodation in complex engineered systems such as, but not limited to, aircraft engines, gas turbines, mechanical systems, chemical processing systems, and electromechanical systems, each with dedicated control systems.

An aircraft engine is composed of interconnected mechanical parts and a computer control system that coordinates their operation. Faults are typically distinguished from gradual deterioration. They are more severe in magnitude and occur at a timescale with a progression much faster (by an order of magnitude) than ordinary wear. Ordinarily, faults cannot be predicted because they are due to factors that cannot directly be observed. An example is inhomogeneities in material that over time may lead to cracks in a blade. The method described below assumes that a diagnostic reasoner indicates the presence of a fault.

Computer simulation models for the engine and its accompanying control systems are described and employed herein. In order to be able to perform fault accommodation on the actual engine on wing, first it is necessary to evaluate and identify what compensation strategies will work in simulation. By having a good sense of what compensatory method will work, as identified through a simulation-based evaluation, it is possible to deploy that same strategy on the engine control system while the engine is on wing. As such, it is highly desirable that the engine and control system simulation models be highly reliable and have a high response fidelity.

Fault accommodation is performed at the engine control systems level by adjusting various controller characteristics. This accommodation is done at the controller level since mechanical systems are not adaptable to change in the manner of computer control software settings. Accommodation at a mechanical level would require at least partial disassembly of the engine (either by humans or robots) and maintenance (either repair or replacement), which is time consuming and expensive. By making changes to the engine control system settings to achieve the same or better result, undesirable maintenance time and expense may be avoided. Of course, for serious problems, or during scheduled maintenance intervals, mechanical disassembly and fix would be performed.

In order to perform fault accommodation, as disclosed herein, the simulation is operated at the level of engine-plus-controller. Therefore, and for all practical purposes, the simulation is representative of the actual engine with its controller. An optimizer, specifically a multi-objective optimizer, is interfaced to the simulation models to identify those control settings that result in the most desirable compensated system behavior. A multi-objective optimizer is utilized to simultaneously consider multiple desirable compensated system behavioral measures, and help identify the best tradeoffs in this system behavioral space.

In an aircraft engine, multiple measures of dissatisfaction of system behavior may be present, which results in a goal to simultaneously minimize multiple dissatisfaction measures. One example of a dissatisfaction measure is the distance away from ideal new engine performance measures, such as stall margin, thrust, and peak exhaust gas temperature, for example. To minimize these dissatisfaction measures, a Pareto frontier is identified, with each point on the Pareto frontier tying back to a particular control adaptation strategy. Subsequent to establishing a Pareto frontier-based solution space, a particular point on the Pareto can be down-selected using a variety of methods, where a corresponding control adaptation strategy can be selected and then deployed to the actual engine's controller to obtain the desired compensated behavior.

In view of the complexity of an aircraft engine and aircraft engine controllers, it is understood that one skilled in the art is a person having knowledge of prior art aircraft engine and aircraft engine controller architectures, and therefore details of such architectures are not presented herein.

An exemplary evolutionary search algorithm is disclosed herein having features and characteristics that make it particularly well suited to the problem of HPC and HPT fault accommodation. More background information is presented on multi-objective evolutionary algorithms and their application to aircraft engine control systems design.

An embodiment of the invention discloses a method to automatically adjust controllers for aircraft engines such that HPC and HPT faults might be temporarily accommodated in-flight. How the optimization of different elements within an overall controller can be addressed is shown in an efficient fashion. These elements include local actuator gains, control modifiers, and control schedules. An evolutionary algorithm, which will be discussed in more detail below, is utilized to realize multi-objective optimization on a local as well as a global level, depending on the optimization task at hand. Fitness functions comprise performance metrics that incorporate stall margins, exhaust gas temperature, fan-speed tracking error, and local tracking errors.

To illustrate the challenges involved with making changes to the controller, the controller design problem is first illuminated. Typically, aircraft engine controller design is an iterative process. Initially, a linear engine model is built by extracting partial derivatives from models based on first-principles (Close et al., 2001). Then, local controllers are designed and optimized using first-principles as well as derivatives from previous engine designs. Next, schedules are designed using performance requirements. Finally, the control logic is established which integrates the individual components and tales overall stability and performance requirements into account.

The performance of the overall control system is tested on increasingly more complex systems starting with the local model, the bare component level model (CLM), the CLM with the full controller integrated, a dry rig test, wet rig test, test cell runs, and test flight. Each test cycle might necessitate a revision of some controller components with renewed validation and verification. There are a number of different categories which are affected by the design and which could also be considered for accommodation:
  local actuator gains, either constant or scheduled,
  logic thresholds,
  adders and multipliers for gains and schedules,
  schedule entries, and
  control logic structure For embodiments of the invention disclosed herein, optimization is performed for select control variables in the first four categories. However, design changes in the control logic structure are contemplated.

Optimization of the controller for nominal engines is broken up into several complementary subtasks. These subtasks include: (i) optimization of the actuator gains, (ii) optimization of the control modifiers (adjustables), and (iii) design and optimization of the control schedules. This task decomposition is a consequence of the fact that local gain modifications often do not result in any significant variation at the global performance level. In addition, the potential for crosstalk, that is, the difficulty to track correlations of several simultaneously manipulated variables on the overall controller, supports the strategy of dividing the optimization endeavor into smaller optimization tasks. Depending on the impact the particular control variable under consideration has on the overall and local performance criteria, we maximize the observability from an optimization standpoint. This means that for some control variables only local performance criteria (local tracking errors, for example) are considered while other control variables are considered from a global level (stall margins (SM), exhaust gas temperature (EGT), and fan-speed tracking error ($n_1$), for example).

FIG. 1 gives an overview of this strategy in the form of a model 100 having several sub-blocks. Information from sensors 130 along with desired performance input 105 are entered into a global and local performance metrics block 110, the output of which is acted upon by an optimization module 115.

Optimization can take advantage of a computational model simulator 100, herein referred to as an FSIM, which can simulate the dynamic behavior of a production aircraft engine and its controller with a high degree of fidelity. The simulation modules comprise the CLM 127 and an emulation of the Full Authority Digital Electronic Control (FADEC) 125. A user may specify control settings and flight scenarios 120, and execute FSIM to obtain the engine response given a high-level (pilot) command such as demanded fan speed, which is a good measure of thrust. In an embodiment, the pilot's thrust specification is via the position of the throttle resolver angle (TRA) measured in degrees, where a lower TRA setting corresponds to a lower thrust demand. Sensors 130 measure various engine response characteristics due to an input thrust demand specification. In an embodiment, sensors 130 in combination with information derived by global and local performance metrics block 110 provide the functionality of a reasoner for indicating the presence of a fault.

Prior to the invention disclosed herein, and for a product development project looking into automated controller adjustments for deteriorated engines, a combination of domain knowledge and several trial runs of FSIM have been utilized to isolate and identify actuator gain candidates to be optimized. Based on the principal consideration of the impact a particular actuator has on engine performance, and fault accommodation, the Fuel Metering Valve (FMV) proportional gain (FMV-Kp), and the Variable Stator Vane (VSV) proportional gain (VSV-Kp) were selected as parameters to be optimized. However, it is appreciated that other actuators can be chosen for fault accommodation as well. While VSV-Kp is a constant, FMV-Kp is a function of the FMV actuator position and the corrected core speed, where a higher core speed results in a higher gain. A simplified view of the proportional path 135 in the VSV actuator control system is shown in FIG. 2, and a simplified view of the proportional path 140 in the FMV actuator control system is shown in FIG. 3.

Figure 2:
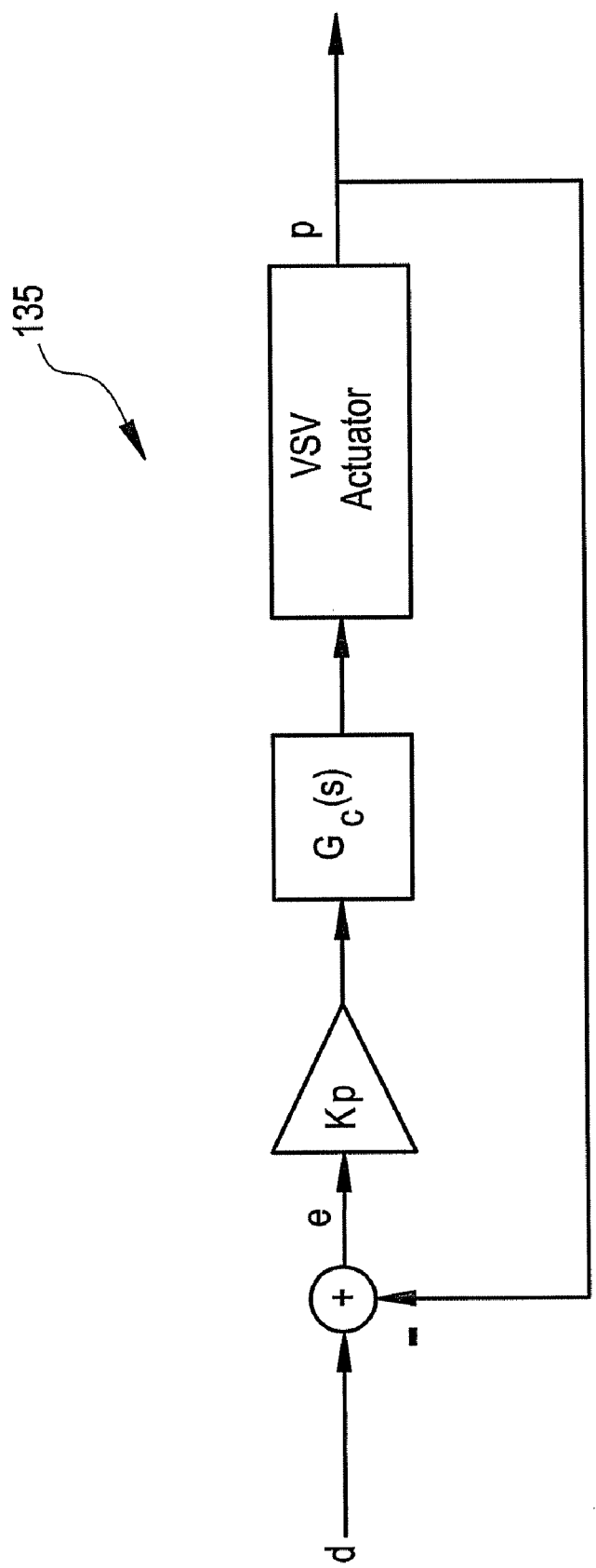
FIG. 2 depicts in schematic form a proportional path in a VSV actuator control system in accordance with embodiments of the invention.
Figure 3:
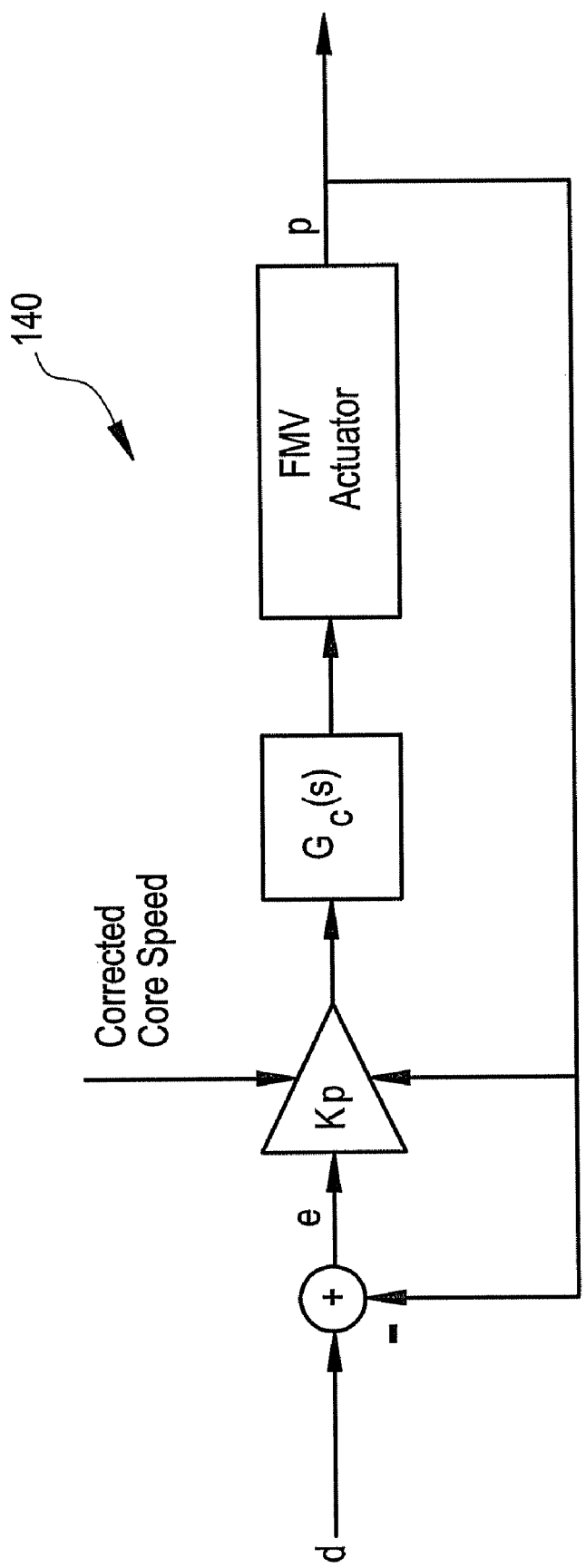
FIG. 3 depicts in schematic form a proportional path in a FMV actuator control system in accordance with embodiments of the invention.

In the actuator loops (proportional paths 135, 140) of FIGS. 2 and 3, d is the demanded actuator position, and p is the achieved actuator position. The optimization problem then is to select that gain value that minimizes the time integral of the square of the position tracking error e of the actuator loop, which is represented by the following equation.

$$\min J = \int_t e^2 \, d\lambda$$

The actuator position demand signal d is computed by the FSIM simulation modules through a complex transformation, known to one skilled in the art, of the thrust demand profile (with respect to time) specified by the pilot.

Figure 4:
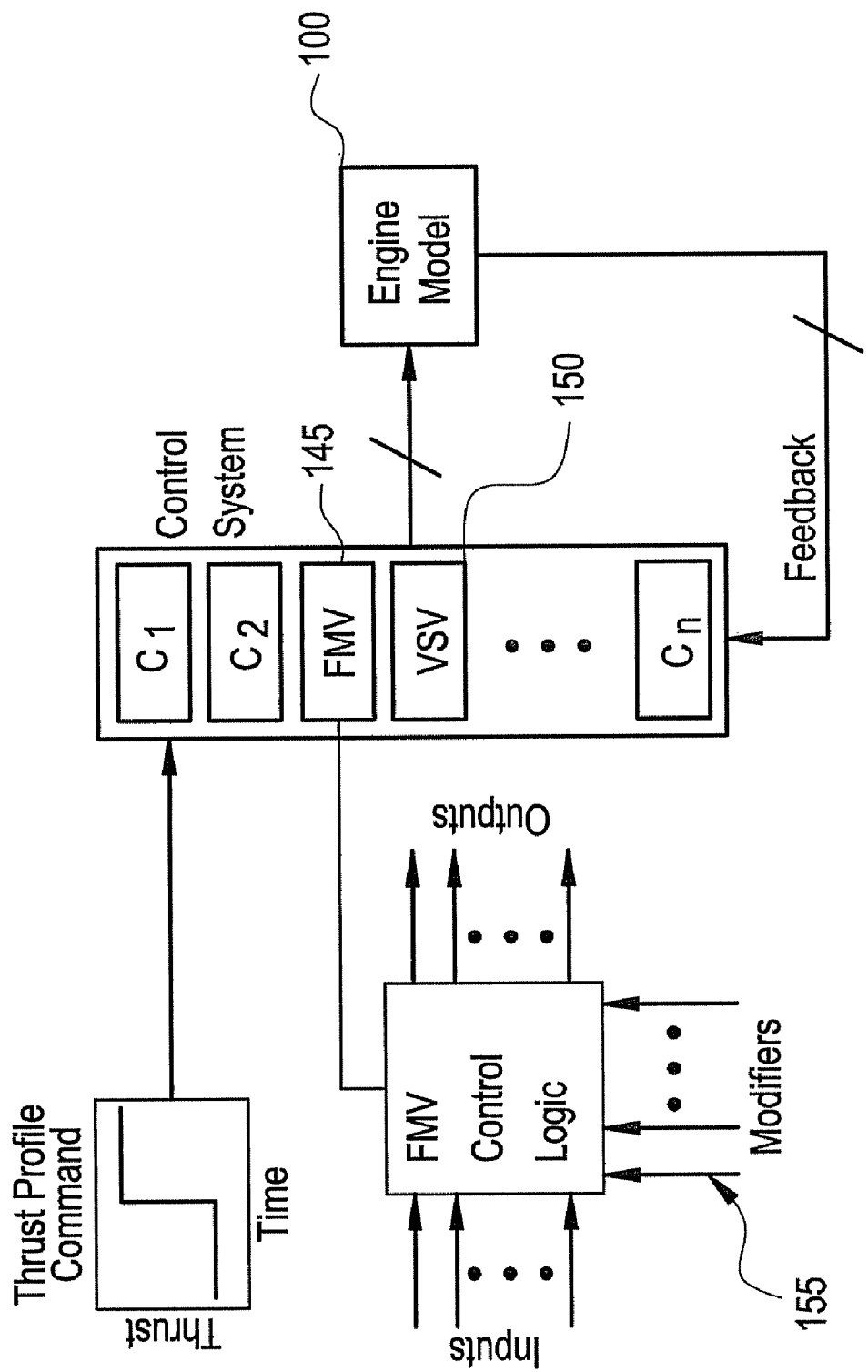
FIG. 4 depicts in block diagram form interconnected control subsystems in accordance with embodiments of the invention.

Referring now to FIG. 4, the engine control system is large and complex, but known to one skilled in the art, with numerous interconnected subsystems such as the FMV 145 and VSV 150 subsystems. Each of these control systems is provided with a suite of modifiers 155, alternatively also referred to as adjustables, that consists of adders and multipliers for gains, adders and multiplier for schedules, and logic thresholds. While only the FMV 145 is illustrated in expanded block diagram form in FIG. 4, it will be appreciated that the VSV 150 and other control subsystems will have a similar expanded block diagram form.

In an embodiment, the FMV control system has a set of 53 modifiers, while the VSV control system has a set of 20 modifiers. Each modifier is adjustable and is a bounded real number, and the bounds are specified in FSIM. The optimization problem is to identify a set of modifiers such that global performance criteria are optimized. Ideally, to attain robustness in solution quality, the performance metric should be cumulatively considered over a number of flight conditions such as:
  altitude,
  Mach number, and
  ambient temperature deviation from standard day and engine configurations such as:
  customer bleed,
  horsepower extraction,
  deterioration, and
  component tolerances.

To adequately evaluate performance, a metric is applied that allows the quantification of all global performance requirements. Such an ideal global performance metric may include one or more of the following relative measures:
  booster stall margin vs booster inlet flow,
  compressor stall margin vs compressor inlet flow,
  VSV demanded position vs corrected core speed,
  VBV demanded position vs corrected fan speed,
  corrected Phi vs corrected core speed,
  combustor fuel/air ratio vs severity parameter,
  high-pressure turbine inlet temperature vs corrected core speed, and
  exhaust gas temperature vs corrected fan speed and time.

As used herein, Phi is the ratio of the fuel flow and the corrected combustor static pressure.

To reduce the complexity of the global performance metric, we focus on typical input variations and study the most important parameters for aircraft engine control systems validation. In particular, we drive to meet all stall margin limits, good tracking of a fan-speed demand profile, and reduction in the peak exhaust gas temperature. Towards this end, let E be the exceedance profile comprising the EGT exceedance $E_{EGT}$, the fan stall margin exceedance $E_{SM_{12}}$, the booster stall margin exceedance $E_{SM_2}$, and the compressor stall margin exceedance $E_{SM_{25}}$, and EGT be the exhaust gas temperature profile, $EGT_{min}$ the table cruise temperature, e the exponent by which the distance to the limit is penalized, a a weight for the temperature component, b a weight for the fan-speed tracking error component, $n_1$ the fan-speed profile, $n_{1_{dmd}}$ the fan-speed demand profile, t the time. Then the multi-objective optimization problem has the vectorial form min J, where $$J = \left[ E; \int_t \max(0, a \cdot (EGT - EGT_{min})^e) \, d\lambda; b \int_t |n_1 - n_{1_{dmd}}| \, d\lambda \right]$$

and $$E = E_{EGT} + E_{SM_{12}} + E_{SM_2} + E_{SM_{25}}$$

$$E_{EGT} = \begin{cases} 0 & \text{if } EGT < EGT_{max} \\ \infty & \text{otherwise} \end{cases}$$

$$E_{SM_{12}} = \begin{cases} \infty & \text{if } SM_{12} < SM_{12_{min}} \\ 0 & \text{otherwise} \end{cases}$$

$$E_{SM_2} = \begin{cases} \infty & \text{if } SM_2 < SM_{2_{min}} \\ 0 & \text{otherwise} \end{cases}$$

$$E_{SM_{25}} = \begin{cases} \infty & \text{if } SM_{25} < SM_{25_{min}} \\ 0 & \text{otherwise} \end{cases}$$

The control logic in a typical aircraft engine controller utilizes a suite of schedules that are functions of one or two input variables. Schedules are typically but not necessarily implemented as lookup tables and the output values are computed via linear interpolation among the closest neighbors. Schedule surfaces (output maps) represent nonlinear transformations of the inputs to the output and are important components of an aircraft engine's control logic.

Based on a combination of domain knowledge, simulation, and knowledge elicitation from domain experts, a particular control schedule, here denoted the F136 schedule (F136 is a control schedule within an aircraft engine available from General Electric Company) in the FMV module was selected as a candidate for use herein for evolutionary optimization. This schedule outputs a rate-gain reduction given the ambient pressure (a physical function of altitude) and compressor speed, and is active during the burst phase for a specific aircraft maneuver called a Bodie, wherein at cruise the pilot cuts thrust for a short time period and increases thrust through a burst before the engine temperatures have achieved steady state at the reduced power level. In the absence of a rate-gain schedule, the fan-speed response during the burst phase is extremely sluggish, which is highly undesirable. What is desirable however, is a rapid return to the original fan speed.

In an embodiment, an optimization problem then is to identify a set of F136 schedule entries such that fan acceleration is maximized during the burst phase of the Bodie, subject to maintaining all stall margins above acceptable limits. Simulation-based evaluation reveals that during this maneuver the EGT is always well within limits and is therefore not included in the global performance metric. Let E be the exceedance profile comprising the fan stall margin exceedance $E_{SM_{12}}$, the booster stall margin exceedance $E_{SM_2}$, and the compressor stall margin exceedance $E_{SM_{25}}$, $n_1$ the fan-speed profile, $n_{1_{dmd}}$ the fan-speed demand profile described as a step function with the step coinciding with the burst phase of the Bodie, t the time. Then the multi-objective optimization problem has the vectorial form min J, where:

$$J = \left[ E; \int_t |n_1 - n_{1_{dmd}}| \, d\lambda \right],$$

and $$E = E_{SM_{12}} + E_{SM_2} + E_{SM_{25}}$$

$$E_{SM_{12}} = \begin{cases} \infty & \text{if } SM_{12} < SM_{12_{min}} \\ 0 & \text{otherwise} \end{cases}$$

$$E_{SM_2} = \begin{cases} \infty & \text{if } SM_2 < SM_{2_{min}} \\ 0 & \text{otherwise} \end{cases}$$

$$E_{SM_{25}} = \begin{cases} \infty & \text{if } SM_{25} < SM_{25_{min}} \\ 0 & \text{otherwise} \end{cases}$$

An evolutionary optimization of a schedule that is the function of two input variables corresponds to a systematic and joint manipulation of the table entries. An important aspect in the optimization of these control surfaces is the smoothness of these derived surfaces. Unless smoothness is explicitly included as a design requirement, an evolutionary optimization can result in noisy, albeit optimal, schedules. To facilitate smoothness in derived schedule surfaces, the entries in each test surface T are filtered using a specialized bi-directional filtering algorithm that is applied to each derived row T (i, j), and is shown below.

$$T_A(i, \infty) = 0 \qquad \qquad 1$$

$$T_A(i, j) = \alpha T_A(i, j+1) + (1 - \alpha) T(i, j) \qquad \qquad 2$$

$$T_S(i, -1) = \alpha T_A(i, 0) \qquad \qquad 3$$

$$T_S(i, j) = \alpha T_S(i, j-1) + (1 - \alpha) T(i, j) \qquad \qquad 4$$

In the algorithm presented above, $\alpha$ is a smoothing factor. The objective of the algorithm is to first identify a reliable starting value $T_S(i, -1)$ (line 3) for each row i following the procedure outlined in lines 1, 2, and 3. This is an important step, since a quality outcome is dependent upon selection of a reliable starting point. Next, the smoothed values $T_S(i, j)$ are computed using the procedure outlined in line 4.

In an embodiment, and for simulation and optimization purposes, the effect of a faulty engine can be modeled by decreasing the efficiencies and flow scalars of the rotating components (as an aside, it is noted that the symptoms of deteriorated engines and engines with some non-catastrophic HPC/HPT faults are similar except that the rate of change of progression of symptoms at fault initiation is often times an order of magnitude higher than the rate of change of deterioration related symptoms). The major modules affected for a commercial high-bypass engine are the fan, booster, compressor, high-pressure turbine, and low-pressure turbine. Relative adjustments to these variables are shown in Table 1, which also shows for comparison adjustments that would be made for small and large HPT and HPC faults for an exemplary commercial, high-bypass, twin-spool, turbofan engine, respectively.

TABLE 1

Typical Fault and Deterioration Adjustments for an exemplary engine simulator

|  | HPC Efficiency Scalar | HPC Flow Scalar | HPT Efficiency Scalar | HPT Flow Scalar |
|---|---|---|---|---|
| Small HPT Fault |  |  | −1.50% | 0.15% |
| Large HPT Fault |  |  | −6% | 0.60% |
| Small HPC Fault | −1.50% | −1.50% |  |  |
| Large HPC Fault | −6% | −6% |  |  |

For deterioration, other adjustments are made to the fan module, booster module, and LPT module to capture the system wide wear. Typical adjustments are shown in Table 2 for a different engine type.

TABLE 2

Typical Deterioration Adjustments

| Component | Efficiency Scalar | Flow Scalar |
|---|---|---|
| Fan | −0.015 | −0.5% |
| Booster | −0.001 | −0.6% |
| LPT | −0.011 | +0.4% |

Since the engine controller is designed to follow the pilot's demanded fan speed to closely meet specified thrust requirements, the changes in a deteriorated (and otherwise not faulted) engine result in higher fuel consumption and higher temperatures of the high- and low-pressure turbine blades. Table 3 gives an example of changes from a nominal engine to a large HPT and HPC fault. For comparison, we list again also signatures for a 50% deteriorated engine. Tables 3-5 show small, and large HPC and HPT faults in comparison to 50% deterioration.

TABLE 3

Typical Fault and Deterioration Effects

| Sensor | % Delta (Large HPT Fault) | % Delta (Large HPC Fault) | % Delta (50% Deterioration) |
|---|---|---|---|
| T12 | −0.37% | −0.37% | 0.3% |
| XN1 | 0.00% | −1.7% | −0.50% |
| XN2 | −0.89% | −1.3% | −1.25% |
| T25 | 2.94% | 4.2% | 0.25% |
| P25 | 2.35% | 1.7% | 0.19% |
| T3C | −2.60% | 3.2% | −1.08% |
| PS3 | −1.00% | −5.2% | −1.92% |
| EGT | 1.32% | 5.5% | 1.23% |

TABLE 4

Typical HPC Fault and Deterioration Effects

| Sensor | % Delta (small HPC Fault) | % Delta (Large HPC Fault) | % Delta (50% Deterioration) |
|---|---|---|---|
| T12 | −0.37% | −0.37% | 0.3% |
| XN1 | −0.30% | −1.7% | −0.50% |
| XN2 | −0.3% | −1.3% | −1.25% |
| T25 | 1.0% | 4.2% | 0.25% |
| P25 | 0.5% | 1.7% | 0.19% |
| T3C | 0.8% | 3.2% | −1.08% |
| PS3 | −1.3% | −5.2% | −1.92% |
| EGT | 1.3% | 5.5% | 1.23% |

TABLE 5

Typical HPT Fault and Deterioration Effects

| Sensor | % Delta (small HPT Fault) | % Delta (Large HPT Fault) | % Delta (50% Deterioration) |
|---|---|---|---|
| T12 | −0.37% | −0.37% | 0.3% |
| XN1 | −0.50% | −1.8% | −0.50% |
| XN2 | −1.7% | −4.4% | −1.25% |
| T25 | 1.1% | 4.1% | 0.25% |
| P25 | 0.5% | 1.7% | 0.19% |
| T3C | −1.6% | −3.9% | −1.08% |
| PS3 | −2.3% | −8.3% | −1.92% |
| EGT | 1.7% | 6.9% | 1.23% |

It is seen that the HPC and HPT faults and deterioration are coupled to quite a degree. Not shown here is a common reduction in stall margins and an increase in thrust and fuel consumption.

In an embodiment, changing controller behavior is further developed by selecting the modifiers of the FMV control logic and the modifiers of the VSV control logic as potential candidates for optimization to recover performance from a faulty engine. These modifiers are same ones described above in connection with FIG. 4. An evolutionary search algorithm is employed to find a set of FMV and VSV modifiers that meet all performance criteria. Again, the performance criterion used is as described in above in connection with FIG. 4.

Discussion now turns to initial observations followed by systematic experiments that led to an embodiment of the simulation-based optimization of actuator gains, controls modifiers, schedules, and control modifiers for faulted engines.

In selecting candidates to which the generic search algorithm was to be applied, several considerations were taken into account. For one, the search was started in an area of constrained complexity. The first subject was the code that handles the adjustments to the variable stator vane (VSV) positions. This operation can be divided into two parts: (i) the determination of the demanded VSV position, based on current flight conditions; and, (ii) the gains and other parameters of the VSV actuator loop itself.

Upon looking at Beacon diagrams (Beacon is a computer program available from Applied Dynamics, Inc. that represents an aircraft engine controller in terms of block diagrams and computational flow diagrams from which the actual computer code is generated) that describe the code used in the ECU (electronic control unit), it was concluded that the gains of the VSV actuator loop made a good starting starting point to demonstrate this approach. Specifically, experiments were carried out with the proportional gain of that loop, since the code had an adjustable adder defined which could be set to any desired value at the start of a rum, without having to rebuild the FSIM code.

Several FSIM runs were made with preset values of VSV-Kp for a combination of a burst (increase of TRA from 36 to 78 degrees), a constant TRA for 25 seconds, followed by a chop (decrease in TRA from 78 to 36 degrees). For a given FSIM run, the value of the proportional-gain adder was varied such that the actual proportional gain was a constant between the limits of 78 and 778. An exemplary design value is 578, and it is a constant (not scheduled according to core speed or any other variable). In terms of the major engine variables, such as fuel flow, fan speed, VSV angle, and exhaust gas temperature (EGT), for example, there were virtually no differences over the 10-fold range of the proportional gain. The only variable that was affected by the change in proportional-gain value was the error in the VSV actuator loop. This observed behavior suggests that the proportional gain could be selected so as to minimize the square of the actuator error.

Optimization of the VSV-Kp follows the procedure outlined above in connection with FIGS. 2-3. Engine operation was simulated subject to changes in throttle position while cruising at 35,000 ft., Mach 0.8, and standard-day temperature.

A burst and Bodie were used to excite the overall system, and gain optimization was performed independently for each of these excitation profiles. While no attempt was made to determine optimized values for other gains in the loop, such as the integral gain, or other parameter values, such as a lead-time constant, it is contemplated that it would certainly be possible to do so.

Next, and with respect to runs with constant values of FMV-Kp, an embodiment of the actuator design method was applied to the fuel metering valve (FMV) actuator loop proportional gain. Here, the actuator controller is slightly more complicated than the VSV one in that the proportional gain is a function of both the FMV actuator position and the core speed, where a higher core speed results in a higher gain. As in the VSV actuator study, it was found that changes in the FMV proportional gain had virtually no effect on the engine variables (fan speed, fuel flow, and temperatures, for example). The scheduling of the gain was removed by modifying the appropriate schedule table (F132) and the burst and chop simulations were run over a wide range of constant gains. As before, only the error in the actuator loop was affected.

Optimization of the FMV-Kp follows the procedure outlined above in connection with the discussion relating to FIGS. 2 and 3. Engine operation was simulated subject to changes in throttle position while cruising at 35,000 ft., Mach 0.8, and standard-day temperature.

In an embodiment, a burst and Bodie were used to excite the overall system, and gain optimization was performed independently for each of these excitation profiles. In order to find important parameters whose values will affect global performance metrics (such as stall margins or exhaust gas temperature, for example), attention was focused on the extensive set of ECU modules that are used to produce the incremental changes in the demanded fuel flow. These incremental changes are continuously summed in order to produce the demand value for the FMV actuator. The behavior during a burst operation, in response to a sudden request from the pilot for an increase in power, was examined. During such a situation, several different regulators are active, depending on the various limits and constraints that must be satisfied in order to guarantee safe operation of the engine. By looking at which regulator was selected as time evolved following the burst command, the sequence of active regulators was determined.

Discussion is now directed to optimization of control system modifiers for a faulted engine. Engine operation was simulated over the range of faulted engines in an off-board optimization. The results were compiled into a lookup scheme, such as a lookup table for example, for quick or immediate retrieval. Operating points for which a direct match was not available were interpolated between existing solutions. The quick retrieval is best illustrated by an example case. At cruise for a nominal, healthy engine, a fault was inserted at 0.5 seconds and then 2 seconds later (reflecting the time a diagnostic tool might take to detect the fault), the adjustment parameters were changed to the accommodated variables determined by the off-board genetic algorithm. The runs continued for 20 seconds to allow transients to settle and achieve the steady-state accommodated measures for operability and performance. The modifiers considered here were VBV Adjustment Adder, VSV Adjustment Adder, Max Core Speed Adder, Horsepower Extraction, ACC Multiplier, ACC Adder, Throttle, Aux Bleed Switch, and Cowl Anti-Ice Switch.

Figure 5:
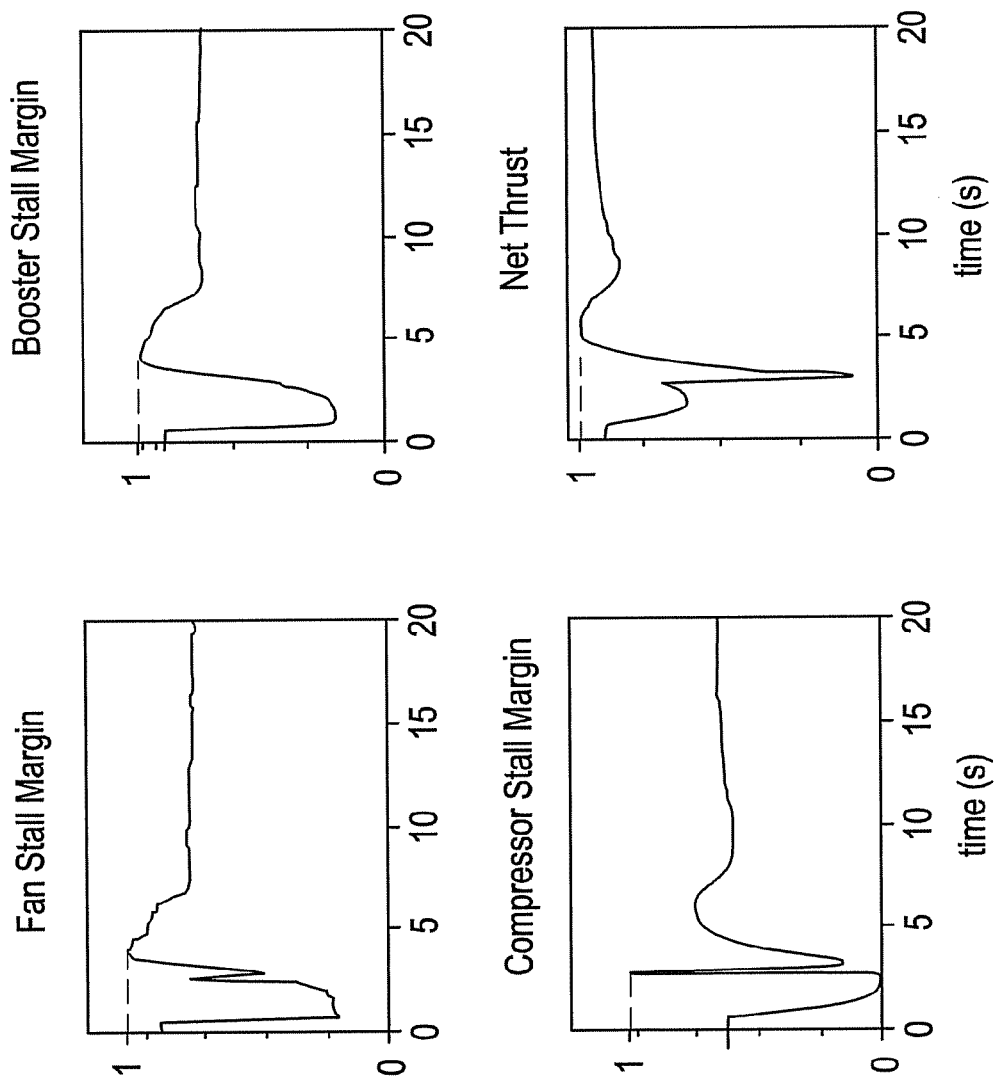
FIG. 5 depicts in graph form results of accommodation for several performance parameters over time in accordance with embodiments of the invention.

FIG. 5 shows the temporal responses for this test case, illustrating Fan Stall Margin, Booster Stall Margin, Compressor Stall margin, and Net Thrust. Although the optimizer considered for this example was only a single joint objective (a special and more limiting case of the multi-objective optimization scheme), all performance metrics recover quickly to safe conditions (illustrated by stabilized characteristic curves). Note that at this point (at the 20-second mark of simulation time) the fault itself still exists but its impact on the performance measures has been accommodated (illustrated by stabilized characteristic curves).

The discussion above showed results for accommodation of the fault using precompiled solutions from off-board optimization. In a next step, it is contemplated that further objectives are being considered to arrive at a solution that provides optimality for a wider time window. Because the primary objectives relating to safe operation have been met, more time can be spent on secondary objectives, including the completion of the mission (which could be the single flight or a set of flights), planning and scheduling (for example, airline schedules), resource availability to complete maintenance at a particular site, risk of secondary damage, to name a few. The computation of solution for this expanded set of objectives can be accomplished either on-board or off-board.

Also, in view of the many and varied solutions available, the results of an embodiment of the multi-objective optimization disclosed herein may be expressed as a Pareto frontier, that is, a Pareto frontier-based solution space. In other words, there are a number of possible solutions that all meet the criteria that may result in different engine behavior. As such, it is then desirable to express a preference for a particular solution from the set of possible solutions. Ideally, the preference could be cast within the objective function. However, the effects of the solutions are not always apparent until after the optimization results are reviewed.

Figure 6:
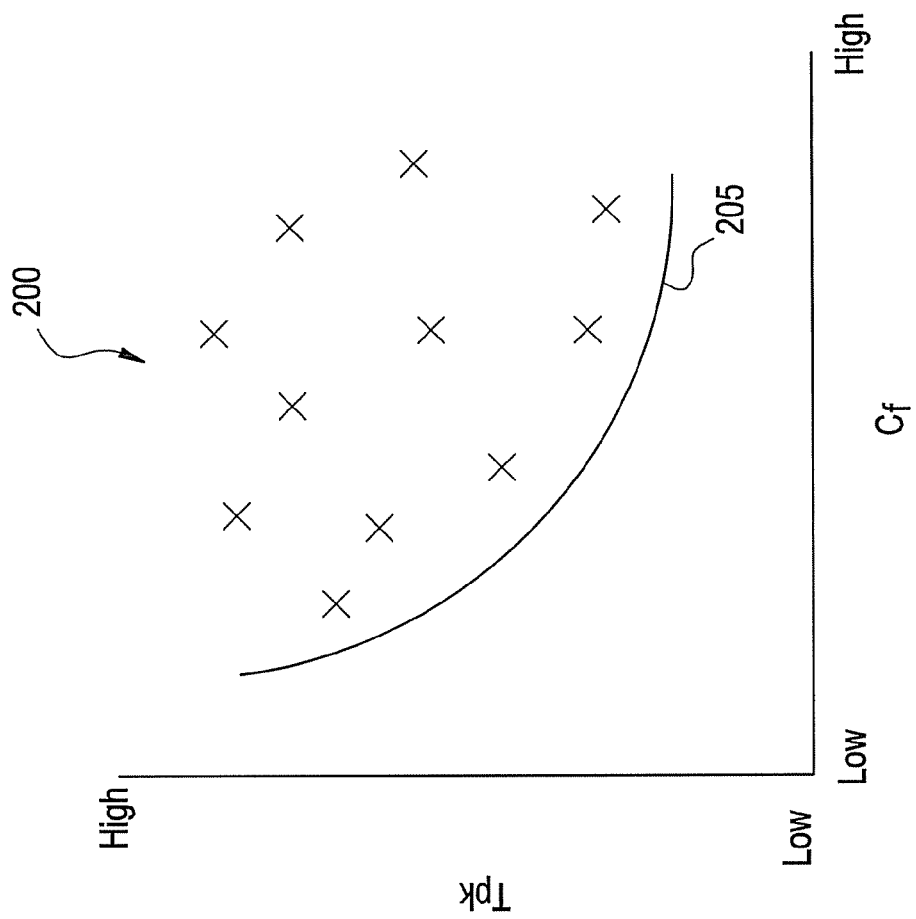
FIG. 6 depicts in graph form an exemplary Pareto frontier-based solution space having a Pareto frontier in accordance with embodiments of the invention.

FIG. 6 illustrates an exemplary Pareto frontier-based solution space 200 having a Pareto frontier 205, which is plotted against two different engine characteristics, such as fuel consumption (Cf) and peak engine temperature (Tpk), for example. From FIG. 6, it will be appreciated that different solutions along the Pareto frontier 205 will result in different engine behavior, by virtue of the different fuel consumption and peak engine temperature characteristics.

In summary, a framework to the accommodation of jet-engine controllers has been formulated by applying evolutionary search algorithms to actuators, multiplicative and additive adjustments, and table generation and/or modification. To that end, meaningful performance functions have been developed whose minimization produces controller parameters that result in desirable engine behavior. The methods disclosed herein incorporate stall margins, peak EGT, and tracking of changing throttle positions. In addition, a smoothing function was employed that in effect penalizes discontinuous table solutions. Then, these techniques were used to successfully adjust up to 73 parameters at a time in the controller of a real commercial aircraft engine. In addition, the ability to tune the proportional gain of a regulator in the context of its operation in a nonlinear environment by minimizing the integral of the square of the actuator error was demonstrated. Moreover, evolutionary search algorithm methodology was employed to generate a 3-D table of the form z=f(x,y) to maintain rapid response to a demanded power increase as a part of a Bodie maneuver. Finally, the methodology disclosed herein was applied to a faulted engine and showed that by adjustment of multiplicative and additive parameters, the engine's stall-margin requirements can be met while also meeting other safety critical requirements.

It is contemplated that the methodology disclosed herein will be useful for future work. One avenue is the integration of the optimization for design assistance during the various design and validation stages, cycle deck over CLM, FSIM, dry rig, wet rig, test cell, and flight test, for example. Moreover, embodiment of the optimization approach disclosed herein may be extended to adapt engine performance based on in-service data, and to adapt engine performance as an engine deteriorates. This assistance could range from automated validation of design choices to suggestion of parameters as discussed and illustrated herein. Another avenue leads to scaling the optimization task. Of particular interest is ensuring cross-communication of individual results from components in a concurrent optimization scheme. Such a co-evolutionary optimization (Subbu and Sanderson, 2004) would allow concurrent module-specific exploration of the global design space, thus responding to the need of both domain-specific focus and adhering to global performance metrics, which could be accomplished via agent-based multi-objective optimization. Also of interest is the integration of external information such as expert knowledge, historical runs, and information from pilots during test flights, for example, which would need the development of an information aggregation component (Goebel et al., 2000, Goebel, 2001) that can deal with the inherent uncertainties and the different format to more formally translate these observations into an objective function and performance metric.

It is also contemplated that individualized optimizations of engines could be performed using modifiers by responding to specific engine characteristics (as opposed to model wide baselines), thus further improving performance. In addition, performance-enhancing optimization may be employed through the reduction of schedule size, thus reducing FADEC memory requirements and improving throughput, which could lead to a selection of optimal schedule size for a number of controllers such as the FMV and power management, which typically deal with large schedules. In addition, the overall FADEC architecture could be optimized by identifying obsolete elements (schedules, for example). Finally, the logic structure itself could be an opportunity for optimization, which could be accomplished through genetic programming or inductive learning such as Experience Based Learning.

With respect to evolutionary algorithms (EAs), EAs include genetic algorithms (Goldberg, 1989, Holland, 1994), evolutionary programming (Fogel et al., 1966), evolution strategies (Bäck, 1996), and genetic programming (Koza, 1992). The principles of these related techniques define a general paradigm that is based on a simulation of natural evolution. EAs perform their search by maintaining at any time t a population $P(t)=\{P_1(t), P_2(t), \ldots, P_P(t)\}$ of individuals. "Genetic" operators that model simplified rules of biological evolution are applied to create the new and more superior population $P(t+1)$. This process continues until a sufficiently good population is achieved, or some other termination condition is satisfied. Each $P_i(t) \in P(t)$ represents, via an internal data structure, a potential solution to the original problem. The choice of an appropriate data structure for representing solutions is very much an "art" than "science" due to the plurality of data structures suitable for a given problem. However, the choice of an appropriate representation is often an important step in a successful application of EAs, and effort is required to select a data structure that is compact, minimally superfluous, and avoids creation of infeasible individuals. For instance, if the problem domain requires finding an optimal real vector from the space defined by dissimilarly bounded real coordinates, it is more appropriate to choose as a representation a real-set-array (a real-set-array being an array of bounded sets of reals) instead of a representation capable of generating bit strings (a representation that generates bit strings can create many infeasible individuals, and is certainly longer than a more compact sequence of reals).

Closely linked to the choice of representation of solutions, is the choice of a fitness function $J: P(t) \to R$, that assigns credit to candidate solutions. Individuals in a population are assigned fitness values according to some evaluation criterion. Fitness values measure how well individuals represent solutions to the problem. Highly fit individuals are more likely to create offspring by recombination or mutation operations. Weak individuals are less likely to be picked for reproduction, and so they eventually die out. A mutation operator introduces genetic variations in the population by randomly modifying some of the building blocks of individuals. Evolutionary algorithms are essentially parallel by design, and at each evolutionary step a breadth search of increasingly optimal sub-regions of the options space is performed. Evolutionary search is a powerful technique of solving problems, and is applicable to a wide variety of practical problems that are nearly intractable with other conventional optimization techniques. Practical evolutionary search schemes do not guarantee convergence to the global optimum in a predetermined finite time, but they are often capable of finding very good and consistent approximate solutions. However, they are shown to asymptotically converge under mild conditions (Subbu and Sanderson, 2004).

Most real-world optimization problems have several, often conflicting objectives. Therefore, the optimum for a multi-objective problem is typically not a single solution—it is a set of solutions that trade-off between objectives. The Italian economist Vilfredo Pareto first generally formulated this concept in 1896, and it bears his name today. A solution is Pareto optimal if (for a maximization problem) no increase in any criterion can be made without a simultaneous decrease in any other criterion. The set of all Pareto optimal points is known as the Pareto frontier or alternatively as the efficient frontier.

Pareto Frontier optimization techniques provide a framework for tradeoff analysis between, or among, desirable element attributes (e.g., where two opposing attributes for analysis may include turn rate versus range capabilities associated with an aircraft design, and the trade-off for an optimal turn rate (e.g., agility) may be the realization of diminished range capabilities). A Pareto Frontier may provide a graphical depiction of all the possible optimal outcomes or solutions. Evolutionary algorithms (EAs) may be employed for use in implementing multi-objective optimization functions. Multi-objective EAs involve searches for, and maintenance of, multiple Pareto-optimal solutions during a given search which, in turn, allow the provision of an entire set of Pareto-optimal (Pareto Frontier) solutions via a single execution of the EA algorithm.

A decision function may be applied to the Pareto Frontier for the decision-making selection. The decision function may be applied to the optimal sets of input-output vector tuples to reduce the number of input-output vector tuples in what may be referred to as a sub-frontier. One such decision function may be based on the application of costs or weights to objectives, whereby a subset of Pareto optimal solutions closest to an objectives weighting may be identified. Additional decision functions such as one that is capable of selecting one of the optimal input-output tuples that minimally perturbs the engine from its current state, may be applied.

In view of the foregoing, it will be appreciated that embodiments of the invention include a method for performing multi-objective fault accommodation that uses a predictive model 100, based on specified control settings for a simulated controller 125 and specified operational scenarios for a simulated machine 127 controlled by the simulated controller, to generate a Pareto frontier-based solution space 200 relating performance of the simulated machine to settings of the simulated controller, including adjustment to the operational scenarios to represent a non-catastrophic HPC (high pressure compressor) or HPT (high pressure turbine) fault condition of the simulated machine. With the model, control settings of an actual controller 125', represented and illustrated by the simulated controller 125, are adjusted for controlling an actual machine 127', represented and illustrated by the simulated machine 127, in response to a non-catastrophic HPC or HPT fault condition of the actual machine, based on the Pareto frontier-based solution space, to maximize desirable operational conditions, such as low fuel consumption for example, and minimize undesirable operational conditions, such as high peak engine temperature for example, while operating the actual machine in a region of the solution space defined by the Pareto frontier 205. In an embodiment, the deteriorated condition of the actual machine is representative of normal wear of the actual machine. In an embodiment, the non-catastrophic HPC and HPT fault conditions of the actual machine are coupled.

In an embodiment, the actual machine 127', and associated simulated machine 127, comprise interwoven subsystems 320, 320' (see FIG. 7 for example), and the aforementioned multi-objective optimization process is performed in a federated, or distributed, manner, thereby allowing the interwoven subsystems, in accordance with methodologies disclosed herein, to find their own respective solutions, while intercorrelations of the subsystems are controlled at a global, or system, level. In an embodiment, the aforementioned maximizing and minimizing are performed off-line and the results stored onboard, or precompiled into lookup tables that are then stored onboard, such that they can be simply retrieved for the online case within a subsecond time frame sufficient to establish safety-restoring operating points for the actual machine 127', thereby accommodating the HPC or HPT fault condition of the actual machine 127'. In an embodiment, the aforementioned maximizing and minimizing are further performed in a time frame greater than a subsecond subsequent to establishing the safety-restoring operating points to enable calculation of trade-offs on the Pareto frontier 205 to incorporate contemporaneous demands on the actual machine 127' and external demands. In an embodiment, the contemporaneous demands on the actual machine 127' include duration of operation of the actual machine, operational safety thresholds of the actual machine, deterioration of the actual machine, risk of secondary damage, logistic considerations for the actual machine, planning considerations for the actual machine, or any combination including at least one of the foregoing demands.

In an embodiment, adjusting of the control settings include a bi-directional filtering algorithm, as set forth above, to facilitate smoothness in the derived schedule surfaces.

In an embodiment, use of the predictive model, and adjustment of the control settings is performed on-board the actual machine, the aircraft for example, and the use of the predictive model and the adjustment of the control settings is performed at any time between consecutive operations of the actual machine, between consecutive flights of the aircraft for example. In an embodiment, adjusting the control settings includes optimizing actuator gains, controls modifiers, and schedules of the CLM of the predictive model, and serve to reduce module temperature peaks, and to increase stall margins of the aircraft engine.

Figure 7:
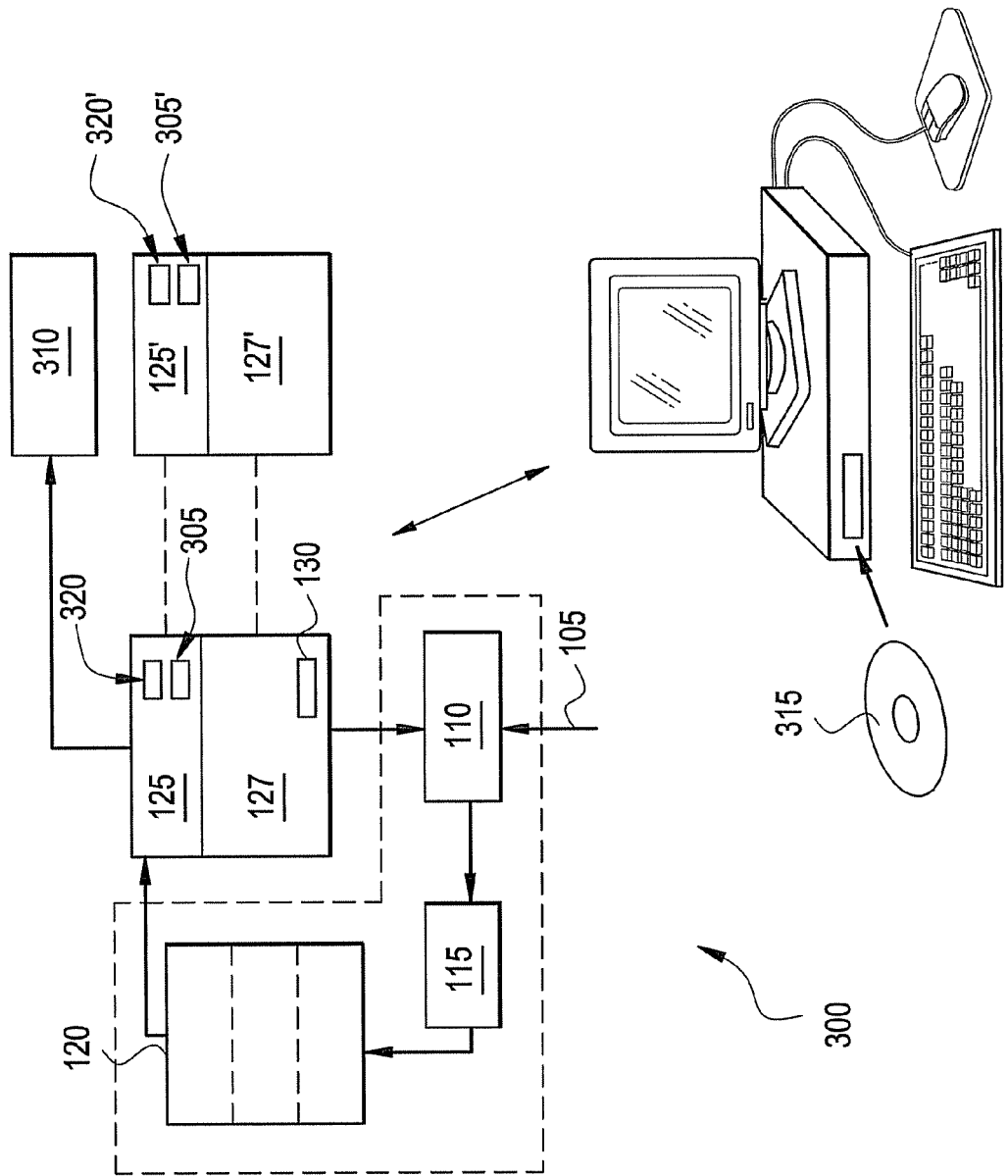
FIG. 7 depicts in block diagram form a system for practicing methods in accordance with embodiments of the invention.

Also in view of the foregoing, and with reference now to FIG. 7, it will be appreciated that embodiments of the invention also include a system 300 for multi-objective HPC or HPT fault accommodation. In an embodiment, the system 300 includes a simulated machine 127 that simulates an HPC or HPT faulted actual machine 127', a simulated controller 125 that simulates an actual controller 125', the simulated machine being controlled by the simulated controller, and the actual machine being controlled by the actual controller, a processor 305 that performs a multi-objective process, based on specified control settings for the simulated controller and specified operational scenarios for the simulated machine controlled by the simulated controller, to generate a Pareto frontier-based solution space 200 relating performance of the simulated machine to settings of the simulated controller, including adjustment to the operational scenarios to represent an HPC or HPT fault condition of the simulated machine, and an adjuster portion 310 that adjusts control settings of the actual controller 125', represented by the simulated controller 125, for controlling the actual machine 127', represented by the simulated machine 127, in response to an HPC or HPT fault condition of the actual machine, based on the Pareto frontier-based solution space, to maximize desirable operational conditions and minimize undesirable operational conditions while operating the actual machine in a region of the solution space defined by the Pareto frontier.

Figure 8:
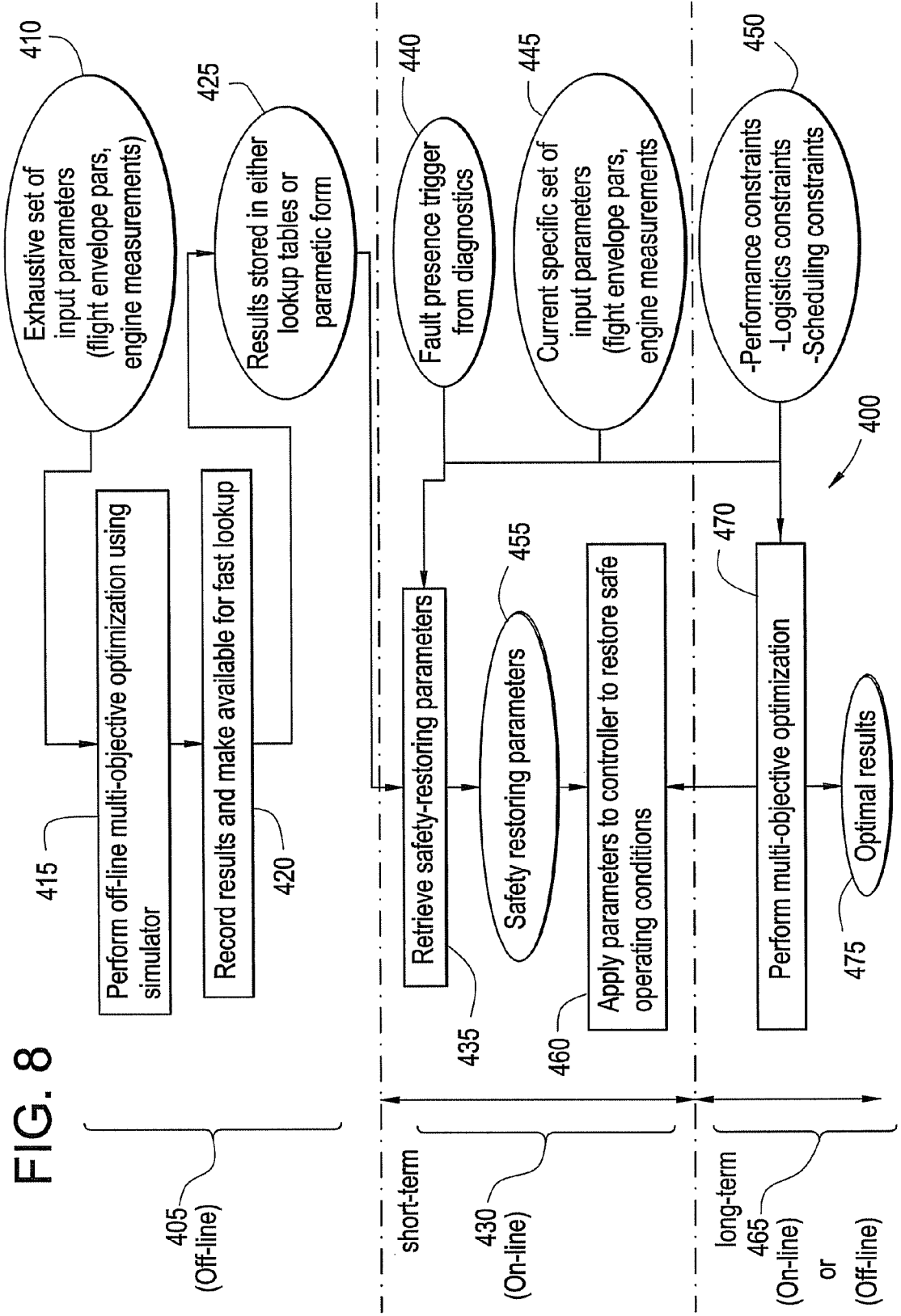
FIG. 8 depicts a flow diagram for a system in accordance with embodiments of the invention.

In view of the foregoing, and with reference now to FIG. 8, a flow diagram 400 for use with system 300 is illustrated. In an off-line state 405, an exhaustive set of input parameters, such as flight envelope parameters and engine measurements for example, 410 are provided. At block 415, off-line multi-objective optimization is performed using simulator 100 and the aforementioned parameters as inputs. At block 420, the analysis results are recorded and made available for subsequent fast lookup. In an embodiment, such availability is provided by storing the results in either a lookup table or in parametric form 425. Referring now to section 430 of flow diagram 400, an on-line state of process 400 is illustrated. Here, the on-line portion of the process begins at block 435 where safety restoring parameters are retrieved via input from aforementioned block 425, via input from block 440, which provides indication of the presence of a fault from the aforementioned reasoner, via input from block 445, which provides a current set of input parameters such as may be received from sensors 130 for example, and via input from block 450, where performance constraints, logistics constraints, and scheduling constraints, are provided by the user. At block 455, the desired safety restoring parameters are applied at block 460 where controller 125 serves to restore actual machine 127' to safe operating conditions by using information from blocks 440, 445 and 450, and by applying multi-objective optimization analysis, as discussed above, from block 470. In section 465 of process 400, which illustrates a portion of process 400 applicable to either on-line or off-line conditions, information from blocks 440, 445 and 450 are provided to block 470 where multi-objective optimization is performed in accordance with methods disclosed herein, and the results are provided to either block 460, as discussed above, or to block 475, which represents optimal results of the multi-objective optimization process.

In an embodiment, a computer readable medium 315 for multi-objective HPC or HPT fault accommodation is provided, the computer readable medium having computer executable instructions for facilitating an embodiment of the aforementioned method.

While an embodiment of the invention has been described employing an aircraft engine and aircraft engine controller, it will be appreciated that the scope of the invention is not so limited, and that the invention may also apply to any machine or complex machinery having a controller for controlling the machine or machinery.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing embodiments of the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to adjust control settings of a controller to accommodate for HPC and HPT faults within an aircraft engine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

REFERENCES

As noted above, various references have been cited showing the state of the art. These references, each of which is incorporated herein by reference in its entirety, include:

[1] T. Bäck. *Evolutionary Algorithms in Theory and Practice*. Oxford University Press, New York, 1996.

[2] C. M. Close, D. K. Frederick, and J. Newell. *Modeling and Analysis of Dynamic Systems*. $3^{rd}$ Edition, John Wiley, New York, 2001

[3] L. J. Fogel, A. J. Owens, and M. J. Walsh. *Artificial Intelligence Through Simulated Evolution*. John Wiley, New York, 1966.

[4] K. F. Goebel, M. Krok, and H. Sutherland. Diagnostic Information Fusion: Requirements Flowdown and Interface Issues, *Proceedings of the IEEE 2000 Aerospace Conference—Advanced Reasoner and Information Fusion Technique*, p. 11.0303, 2000.

[5] K. F. Goebel, Architecture and Design of a Diagnostic Information Fusion Tool, *Artificial Intelligence for Engineering Design, Analysis and Manufacturing*, Vol. 15 (4), pp. 335-348, September 2001.

[6] D. E. Goldberg. *Genetic Algorithms in Search, Optimization, and Machine Learning*. Addison-Wesley, Massachusetts, 1989.

[7] J. H. Holland. *Adaptation in Natural and Artificial Systems: an Introductory Analysis with Applications to Biology, Control, and Artificial Intelligence*. The MIT Press, Cambridge, Mass., $3^{rd}$ edition, 1994.

[8] J. Koza. *Genetic Programming: On the Programming of Computers by means of Natural Selection*. The MIT Press, Cambridge, Mass., 1992.

[9] R. Subbu and A. C. Sanderson, "Modeling and Convergence Analysis of Distributed Coevolutionary Algorithms," *IEEE Transactions on Systems, Man, and Cybernetics (Part-B)*, 34(2), 2004.

[10] R. Subbu and A. C. Sanderson, "Network-Based Distributed Planning using Coevolutionary Agents: Architecture and Evaluation," IEEE Transactions on Systems, Man, and Cybernetics (Part-A), 34(2), 2004.

[11] R. Rausch, N. Goebel, N. Eklund, and B. Brunell, "Integrated Fault Detection and Accommodation: A Model-Based Study", Proceedings of the ASME Turbo Expo 2005, v. 1, pp. 561-569, 2005.

[12] R. Rausch, D. Viassolo, A. Kumar, K. Goebel, N. Eklund, B. Brunell, P. Bonanni, "Towards In-Flight Detection and Accommodation of Faults in Aircraft Engines", Proceedings of AIAA 1st Intelligent Systems Technical Conference, pp. 1-11, 2004.

What is claimed as new and desired to be protected by Letters Patent of the United States is:

1. A method for multi-objective fault accommodation using predictive modeling, the method comprising:
   using a simulated machine that simulates a faulted actual machine;
   using a simulated controller that simulates an actual controller, the simulated machine being controlled by the simulated controller, and the actual machine being controlled by the actual controller;
   performing a multi-objective optimization process, based on specified control settings for the simulated controller and specified operational scenarios for the simulated machine controlled by the simulated controller, to generate a Pareto frontier-based solution space relating performance of the simulated machine to settings of the simulated controller, including adjustment to the operational scenarios to represent a fault condition of the simulated machine; and
   adjusting control settings of the actual controller, represented by the simulated controller, for controlling the actual machine, represented by the simulated machine, in response to a fault condition of the actual machine, based on the Pareto frontier- based solution space, to maximize desirable operational conditions and minimize undesirable operational conditions while operating the actual machine in a region of the solution space defined by the Pareto frontier.

2. The method of claim 1, wherein:
the actual machine is an aircraft engine.

3. The method of claim 2, wherein:
the fault condition is a non-catastrophic high pressure compressor (HPC) or high pressure turbine (HPT) fault condition.

4. The method of claim 2, wherein:
the adjusting control settings comprises optimizing actuator gains, controls modifiers, and schedules of a component level model of the predictive model.

5. The method of claim 2, wherein:
the adjusting control settings serves to reduce module temperature peaks, and to increase stall margins of the aircraft engine.

6. The method of claim 1, wherein:
the faulted condition of the simulated machine is representative of the non-catastrophic faulted condition of the actual machine.

7. The method of claim 1, wherein:
the maximizing and the minimizing are performed off-line and solutions are precompiled into lookup tables that are stored onboard such that a solution is accessible within a subsecond time frame sufficient to establish safety-restoring operating points for the actual machine, thereby accommodating the fault condition of the actual machine.

8. The method of claim 7, wherein:
the maximizing and the minimizing are further performed in a time frame greater than a subsecond subsequent to establishing the safety-restoring operating points to enable calculation of trade-offs on the Pareto frontier to incorporate contemporaneous demands on the actual machine and external demands.

9. The method of claim 8, wherein:
the contemporaneous demands on the actual machine includes one of operational safety thresholds of the actual machine, duration of operation of the actual machine, deterioration of the actual machine, risk of secondary damage, logistic considerations for the actual machine, planning considerations for the actual machine, or combinations thereof.

10. The method of claim 1, wherein:
the using and the adjusting are performed on-board the actual machine.

11. The method of claim 10, wherein:
the using mad the adjusting are performed at may time between consecutive operations of the actual machine.

12. The method of claim 1, wherein:
the adjusting control settings comprises applying a bi-directional filtering algorithm to facilitate smoothness in derived schedule surfaces.

13. The method of claim 1 wherein:
the performing a multi-objective optimization process is carried out in a federated manner such that subsystems find their own solutions, and subsystem intercorrelations are controlled at a system level.

14. A system for multi-objective fault accommodation using predictive modeling, the system comprising:
a simulated machine that simulates a faulted actual machine;
a simulated controller that simulates an actual controller, the simulated machine being controlled by the simulated controller, and the actual machine being controlled by the actual controller;
a processor that performs a multi-objective optimization process, based on specified control settings for the simulated controller and specified operational scenarios for the simulated machine controlled by the simulated controller, to generate a Pareto frontier-based solution space relating performance of the simulated machine to settings of the simulated controller, including adjustment to the operational scenarios to represent a fault condition of the simulated machine; and
an adjuster portion that adjusts control settings of the actual controller, represented by the simulated controller, for controlling the actual machine, represented by the simulated machine, in response to a fault condition of the actual machine, based on the Pareto frontier-based solution space, to maximize desirable operational conditions and minimize undesirable operational conditions while operating the actual machine in a region of the solution space defined by the Pareto frontier.

15. The system of claim 14, wherein:
the actual machine is an aircraft engine.

16. The system of claim 15, wherein:
the fault condition is a non-catastrophic high pressure compressor (HPC) or high pressure turbine (HPT) fault condition.

17. A computer readable storage medium for multi-objective fault accommodation using predictive modeling, the computer readable medium comprising computer executable instructions which when executed on a computer perform a process comprising:
simulating a faulted actual machine;
simulating an actual controller that controls the actual machine;
performing a multi-objective optimization process, based on specified control settings for the simulated controller and specified operational scenarios for the simulated machine controlled by the simulated controller; and
generating a Pareto frontier-based solution space relating performance of the simulated machine to settings of the simulated controller, including adjustment to the operational scenarios to represent a fault condition of the simulated machine;
wherein the Pareto frontier-based solution space is capable of being used for adjusting control settings of the actual controller for controlling the actual machine, in response to a fault condition of the actual machine, to maximize desirable operational conditions and minimize undesirable operational conditions while operating the actual machine in a region of the solution space defined by the Pareto frontier.

* * * * *

UNITED STATES PATENT AND TRADEMARK OFFICE
CERTIFICATE OF CORRECTION

| | | |
|---|---|---|
| PATENT NO. | : 7,904,282 B2 | Page 1 of 1 |
| APPLICATION NO. | : 11/689874 | |
| DATED | : March 8, 2011 | |
| INVENTOR(S) | : Goebel et al. | |

It is certified that error appears in the above-identified patent and that said Letters Patent is hereby corrected as shown below:

On Title Page 2, in Field (56), under "OTHER PUBLICATIONS", in Column 1, Line 8, delete "Accomodation:" and insert -- Accommodation: --, therefor.

In Fig. 8, Sheet 8 of 8, for Tag "425", in Line 3, delete "parametic" and inset -- parametric --, therefor.

In Column 4, Line 60, delete "tales" and insert -- takes --, therefor.

In Column 7, Line 11, delete "table" and insert -- acceptable --, therefor.

In Column 10, Line 52, delete "rum," and insert -- run, --, therefor.

In Column 18, Line 36, delete "N. Goebel," and insert -- K. Goebel, --, therefor.

In Column 19, Line 1, in Claim 1, delete "frontier- based" and insert -- frontier-based --, therefor.

In Column 19, Line 52, in Claim 11, delete "mad" and insert -- and --, therefor.

In Column 19, Line 52, in Claim 11, delete "may" and insert -- any --, therefor.

Signed and Sealed this
Seventh Day of February, 2012

David J. Kappos
*Director of the United States Patent and Trademark Office*